US008644580B2

United States Patent
Lynch

(10) Patent No.: US 8,644,580 B2
(45) Date of Patent: Feb. 4, 2014

(54) DETECTION OF RNA IN TISSUE SAMPLES

(75) Inventor: David Lynch, North Andover, MA (US)

(73) Assignee: Cambridge Research & Instrumentation, Inc., Hopkinton, MA (US)

( * ) Notice: Subject to any disclaimer, the term of this patent is extended or adjusted under 35 U.S.C. 154(b) by 1188 days.

(21) Appl. No.: 12/537,342

(22) Filed: Aug. 7, 2009

(65) Prior Publication Data
US 2010/0034453 A1 Feb. 11, 2010

Related U.S. Application Data

(60) Provisional application No. 61/087,040, filed on Aug. 7, 2008.

(51) Int. Cl.
*G06K 9/00* (2006.01)

(52) U.S. Cl.
USPC .......................................................... 382/133

(58) Field of Classification Search
USPC .......................................................... 382/133
See application file for complete search history.

(56) References Cited

U.S. PATENT DOCUMENTS

| | | | |
|---|---|---|---|
| 5,521,705 A | 5/1996 | Oldenbourg et al. |
| 5,539,517 A | 7/1996 | Cabib et al. |
| 5,784,162 A | 7/1998 | Cabib et al. |
| 5,991,028 A | 11/1999 | Cabib et al. |
| 5,995,645 A | 11/1999 | Soenkson et al. |
| 6,007,996 A | 12/1999 | McNamara et al. |
| 6,142,629 A | 11/2000 | Adel et al. |
| 6,373,568 B1 | 4/2002 | Miller et al. |
| 6,421,131 B1 | 7/2002 | Miller |
| 6,690,466 B2 | 2/2004 | Miller et al. |
| 6,876,760 B1 * | 4/2005 | Vaisberg et al. ............... 382/129 |
| 6,920,239 B2 | 7/2005 | Douglass et al. |
| 6,924,893 B2 | 8/2005 | Oldenbourg et al. |
| 7,383,134 B2 * | 6/2008 | Piper et al. ....................... 702/19 |

(Continued)

FOREIGN PATENT DOCUMENTS

| WO | WO 9401968 A1 * | 1/1994 |
|---|---|---|
| WO | WO 98/43042 | 10/1998 |

(Continued)

OTHER PUBLICATIONS

Nelson et al., "RAKE and LNA-ISH reveal microRNA expression and localization in archival human brain," *RNA* 12:187-191 (2006).

(Continued)

*Primary Examiner* — Sind Phongsvirajati
*Assistant Examiner* — John Go
(74) *Attorney, Agent, or Firm* — Fish & Richardson P.C.

(57) ABSTRACT

Methods of identifying microRNA labeled with a fluorescent probe in a biological sample are disclosed. The methods include obtaining a plurality of fluorescence images of the sample and forming an image stack based on the plurality of fluorescence images, decomposing the image stack to obtain a component image that corresponds to the labeled microRNA, and identifying the microRNA based on the component image.

45 Claims, 9 Drawing Sheets

(56) References Cited

U.S. PATENT DOCUMENTS

| | | |
|---|---|---|
| 2002/0186875 A1* | 12/2002 | Burmer et al. ............... 382/133 |
| 2003/0081204 A1 | 5/2003 | Cronin et al. |
| 2003/0138140 A1 | 7/2003 | Marcelpoil et al. |
| 2003/0223248 A1 | 12/2003 | Cronin et al. |
| 2005/0065440 A1 | 3/2005 | Levenson |
| 2005/0282211 A1* | 12/2005 | Nuwaysir et al. ............... 435/6 |
| 2006/0078915 A1* | 4/2006 | Fuchs et al. ............... 435/6 |
| 2006/0082762 A1 | 4/2006 | Leverette et al. |
| 2006/0119865 A1 | 6/2006 | Hoyt et al. |
| 2006/0228016 A1* | 10/2006 | Vaisberg et al. ............... 382/133 |
| 2006/0245631 A1* | 11/2006 | Levenson et al. ............. 382/133 |
| 2007/0016082 A1 | 1/2007 | Levenson et al. |
| 2007/0231784 A1 | 10/2007 | Hoyt et al. |
| 2008/0074644 A1 | 3/2008 | Levenson et al. |
| 2008/0074649 A1 | 3/2008 | Levenson et al. |
| 2009/0226059 A1 | 9/2009 | Levenson et al. |
| 2009/0257640 A1 | 10/2009 | Gossage et al. |
| 2010/0075373 A1 | 3/2010 | Hoyt |
| 2011/0182490 A1 | 7/2011 | Hoyt et al. |

FOREIGN PATENT DOCUMENTS

| | | |
|---|---|---|
| WO | WO 2005/040769 | 5/2005 |
| WO | WO 2006/081547 | 8/2006 |
| WO | WO 2008/039758 | 4/2008 |

OTHER PUBLICATIONS

Nelson et al., "MicroRNAs (miRNAs) in Neurodegenerative Diseases," *Brain Pathology* 18: 130-138 (2008).

Wang et al., "The Expression of MicroRNA miR-107 Decreases Early in Alzheimer's Disease and May Accelerate Disease Progression through Regulation of (β-Site Amyloid Precursor Protein-Cleaving Enzyme 1," *Journal of Neuroscience* 28(5): 1213-1223 (2008).

* cited by examiner

US 8,644,580 B2

DETECTION OF RNA IN TISSUE SAMPLES

CROSS-REFERENCE TO RELATED APPLICATIONS

This application claims priority to U.S. Provisional Patent Application No. 61/087,040, filed on Aug. 7, 2008, the entire contents of which are incorporated herein by reference.

TECHNICAL FIELD

This disclosure relates to imaging of samples.

BACKGROUND

MicroRNA (miRNA) fragments are non-coding RNA segments that appear to play an important role in translation regulation of messenger RNA (mRNA), and may be a contributing factor in various diseases including neurogenerative diseases. There are many different types of miRNA, and a given type of miRNA may play a regulatory role in multiple processes. The small size of miRNA (e.g., typically 8-22 base pairs) can make labeling and detecting these molecules difficult, because the miRNA molecules are often smaller even than typical probe molecules that are used for labeling.

A closely related family of molecules are termed small interfering RNA (siRNA). These molecules have comparable composition, size, and behavior to miRNA, but are not naturally occurring in the cell and are introduced by methods such as gene therapy.

SUMMARY

In general, in a first aspect, the disclosure features a method of identifying microRNA labeled with a fluorescent probe in a biological sample. The method includes obtaining a plurality of fluorescence images of the sample and forming an image stack based on the plurality of fluorescence images, decomposing the image stack to obtain a component image that corresponds to the labeled microRNA, and identifying the microRNA based on the component image.

Embodiments of the method can include any of the following features.

The decomposing can include obtaining at least one component image that corresponds to autofluorescence of the sample.

The labeled microRNA can include in situ microRNA, and the component image can corresponds to the in situ microRNA in the sample. Identifying the microRNA can include displaying an image derived from the component image. Alternatively, or in addition, identifying the microRNA can include identifying regions of the component image having an intensity level larger than a non-zero threshold intensity level.

The decomposing can include obtaining additional component images, each of the additional component images corresponding to other components in the sample. The other components can include at least one different type of microRNA. Each of the different types of microRNA can be labeled with a different fluorescent probe. The decomposing can include, for each of the different types of microRNA, obtaining at least one additional component image corresponding to the different type of microRNA. The other components can include at least one of messenger RNA, small interfering RNA, proteins, and oligosaccharides.

The method can include displaying at least one image derived from the additional component images. The method can include identifying at least some of the other components in the sample based on the at least one image derived from the additional component images. Identifying at least some of the other components can include identifying one or more of the other components that are at least partially co-localized with the microRNA in the fluorescence images.

Each of the fluorescence images can include spectral contributions in one or more of the red, green, and blue regions of the electromagnetic spectrum. Decomposing the image stack can include separating one or more of the fluorescence images into contributions in one or more of the red, green, and blue regions of the electromagnetic spectrum.

Decomposing the image stack can include spectrally unmixing the image stack.

The method can include obtaining the sample as a tissue section prior to obtaining the plurality of fluorescence images, where the sample is not transfected to enhance production of the microRNA.

Identifying the microRNA can include determining a concentration of the microRNA in the sample based on pixel intensity values in the component image. Identifying the microRNA can include determining a distribution of the microRNA in the sample based on the component image. The method can include determining one or more statistical measurements based on the distribution of the microRNA in the sample.

The sample can include a plurality of cells, and identifying the microRNA can include identifying microRNA in each of one or more of the plurality of cells.

The sample can include a plurality of cells, and each of one or more of the plurality of cells can include at least some of the other components. The at least some of the other components can include different types of microRNA.

The decomposing can be performed based on an estimate of spectral contributions of the labeled microRNA to the fluorescence images. Alternatively, or in addition, the decomposing can be performed based on an estimate of spectral contributions of at least one additional component in the sample to the fluorescence images. Further alternatively, or in addition, the decomposing can be performed based on an estimate of spectral contributions due to sample autofluorescence to the fluorescence images.

The method can include classifying the sample based on the component image. The classifying can include: (i) prior to obtaining the images, applying at least one counterstain to the sample; (ii) decomposing the image stack to obtain a component image corresponding to the at least one counterstain; and (iii) classifying the sample based on the component images that correspond to the microRNA and the counterstain. The plurality of fluorescence images can include contributions from the at least one counterstain.

The classifying can include: (i) prior to obtaining the images, applying at least one counterstain to the sample; (ii) obtaining a second plurality of images of the sample based on incident radiation that is transmitted by or reflected from the sample, the second plurality of images including contributions from the at least one counterstain; (iii) decomposing the second plurality of images to obtain a component image that corresponds to the at least one counterstain; and (iv) classifying the sample based on the component images that correspond to the microRNA and the counterstain.

The at least one counterstain can selectively bind to one or more structural features in the sample. The one or more structural features can include cell nuclei.

The component image corresponding to the at least one counterstain can include information about the positions of cells in the sample, and the component image corresponding to the miRNA can include information about miRNA in the cells. The classifying can include classifying each of multiple cells in the sample based on information about miRNA in the cells.

The method can also include any of the other features or steps disclosed herein, as appropriate.

In another aspect, the disclosure features a method that includes applying a first fluorescent probe in a first sample preparation procedure to a first biological sample that includes microRNA to label the microRNA, applying a second fluorescent probe in a second sample preparation procedure to a second biological sample that includes microRNA to label the microRNA, obtaining a plurality of fluorescence images of the first and second samples, decomposing the plurality of fluorescence images to obtain component images corresponding to the microRNA in the first and second samples, and selecting one of the first and second procedures based on the component images.

Embodiments of the method can include any of the following features.

The selecting can include identifying regions in each of the component images having an intensity level larger than a non-zero threshold intensity level.

The method can include, for each of the component images, determining a total fluorescence intensity corresponding to microRNA, and selecting the first or second procedure based on the total fluorescence intensities. The method can include, for each of the component images, determining a distribution of the microRNA in the sample based on the component image, and selecting the first or second procedure based on the distributions.

The decomposing can include, for each of the samples, obtaining additional component images, each of the additional component images corresponding to components in the sample other than the microRNA. The method can include, for each of the samples, identifying one or more of the other components in the sample based on the additional component images, and selecting the first or second procedure based on information derived from the additional component images.

The method can include obtaining the first and second samples as tissue sections prior to obtaining the plurality of fluorescence images, where the first and second samples are not transfected to enhance production of the microRNA.

The first and second fluorescent probes can be the same. Alternatively, the first and second probes can be different. The first and second samples can be the same sample (e.g., different portions of the same sample). Alternatively, the first and second samples can be different.

The systems and methods disclosed herein provide a number of advantages. In some embodiments, miRNA can be identified and quantified in samples such as tissue sections, where other techniques for imaging miRNA might otherwise not be sensitive enough to identify the miRNA. For example, the methods and systems disclosed herein can be used to identify miRNA in samples that are difficult or even impossible to visually identify, either manually or by machine-implemented image analysis algorithms. However, by decomposing such images (e.g., spectrally unmixing the images) into contributions from different sample components, relatively weak spectral contributors—which can include labeled miRNA in some samples—can be identified and quantified separately from stronger spectral contributors such as sample autofluorescence.

In certain embodiments, the methods and systems disclosed herein can be used to measure both quantitative and qualitative properties of miRNA in samples. Qualitatively, one or more different types of miRNA can be identified by labeling the different types of miRNA with different fluorescent labels, and then decomposing multispectral fluorescence images of the sample into contributions from each of the different labels. Quantitatively, the amount of each of the different types of miRNA can be determined, for example, by determining a total fluorescence intensity in the sample (or in certain portions of the sample) from pixel intensities in component images corresponding to the different types of miRNA. Each of the component images also includes spatially resolved information regarding the distribution of the different types of miRNA in the sample. The spatially resolved information can be used to obtain distribution information regarding the different types of miRNA in the sample. Further, distributions of each of one or more different types of miRNA in portions of the sample (e.g., individual regions or cells of the sample) can be determined.

In some embodiments, the methods and systems disclosed herein can be used to obtain information about other sample components—both naturally fluorescing components and labeled components—in addition to miRNA. Such additional components include, for example, mRNA, siRNA, proteins, and oligosaccharides. Quantitative information about each of these additional components, including total amounts of these components and distributions of these components in the sample (or portions thereof such as individual cells) can also be obtained. Information about these additional components can be used, in combination with information about miRNA, to identify disease conditions in the sample, to classify different regions of the sample, and more generally, to deduce information about the sample. For example, information about miRNA and mRNA in sample cells can be used to infer the role that miRNA plays in regulation of mRNA in the cells.

In certain embodiments, the methods and systems disclosed herein permit imaging of miRNA in samples after significantly fewer sample preparatory steps than are otherwise common in conventional miRNA imaging procedures. For example, samples imaged using the methods and systems disclosed herein are generally not transfected to artificially increase the amount of miRNA in the samples. Further, the samples are generally not subjected to polymerase chain reaction steps to amplify miRNA prior to imaging. As a result, component images corresponding to miRNA in the samples more accurately reflect the actual distribution of miRNA in the samples under ordinary biological conditions (e.g., in a living sample) than sample images acquired for samples that have undergone treatments that alter the amount and/or distribution of miRNA in the samples. Quantitative information about miRNA from component images obtained as disclosed herein can provide a more accurate picture of various cellular processes, including signaling and translation regulation, than information derived from altered samples.

In some embodiments, the methods and systems disclosed herein permit imaging and identification of multiple sample components (including miRNA), even if some of the multiple components are partially co-localized in the fluorescence images. For example, within certain regions of a sample, more than one type of miRNA, or one type of miRNA and one or more other sample components, may be spatially overlapped, so that separating contributions from each of the components to the fluorescence images based purely on the spatial information in the images may be difficult. However, by decomposing (e.g., spectrally separating and/or spectrally unmixing) the fluorescence images, contributions from each of the sample components can be identified, even if the components are partially co-localized in the fluorescence images.

All publications, patent applications, patents, and other references mentioned herein are incorporated by reference in their entirety. In case of conflict, the present specification, including definitions, will control.

The details of one or more embodiments are set forth in the accompanying drawings and the description below. Other features and advantages will be apparent from the description, drawings, and claims.

DESCRIPTION OF DRAWINGS

Like reference symbols in the various drawings indicate like elements.

DETAILED DESCRIPTION

Figure 1:
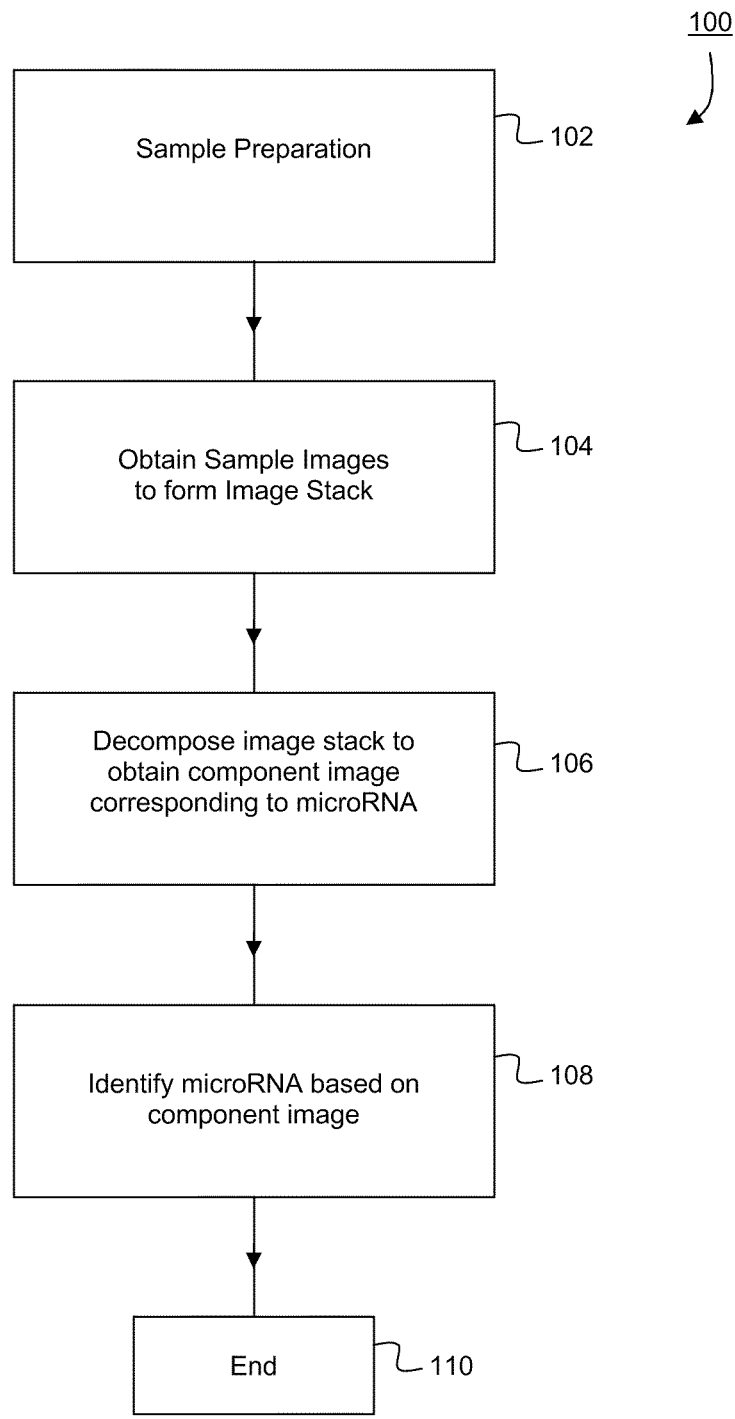
FIG. 1 is a flow chart showing steps for identifying miRNA in samples.

Primary experimental techniques for detecting and distinguishing between various types of miRNA include the use of microarrays and quantitative polymerase chain reaction (qPCR) methods. Each of these techniques typically operates on homogenized samples, and can provide insight into the type(s) of miRNA present in the samples. However, microarrays and qPCR methods typically provide comparatively sparse information about the miRNA profiles of individual cells, or of variations among miRNA profiles of cells of different types. In particular, when several types of miRNA are present in sample cells, it can be difficult to obtain information using these techniques about which combinations of different types of miRNA are present in individual cells, or in certain types of cells. Such information might prove to be valuable, for example, in studying interactions between different species of miRNA in particular cellular environments.

Methods have also been developed to study miRNA indirectly by observing phenotypical phenomena such as apoptosis, cell proliferation, and altered tissue architecture as the miRNA environment in a sample varies (see, e.g., "miRNAs as Therapeutic Intervention Points," available from http://www.asuragen.com/pdfs/microRNA_therapeutics.pdf). Further, transfection methods can be used to artificially increase the amount of miRNA that sample cells produce. As a result, labeling the miRNA with a fluorescent probe can lead to a larger fluorescence signal than would otherwise be measured if the sample was not transfected. The component of the measured total fluorescence signal for the sample that is due to miRNA can be strong enough to separate from fluorescence contributions due to other sample components, either manually or using machine-based visual inspection tools. In certain embodiments, however, even after transfection, the fluorescence signal due to miRNA may still not be strong enough to observe visually, depending upon the type of sample and the transfection procedure. As an example, protein expression levels in Hep G2 cells can be measured by transfecting the cells with let-7 miRNA precursors. Fluorescence images of the transfected cells in situ can be compared against fluorescence images of non-transfected Hep G2 cells (e.g., control cells) to determine the effect of transfection on protein expression. However, even using such methods, it may not be possible to observe distinguishable fluorescence signals that can be assigned to direct contributions from miRNA only.

Other methods have also been used to investigate miRNA in biological samples. For example, in situ hybridization and imaging of miRNA species miR-124a, miR-125b, and miR-9 in human brain tissue has been reported (see, e.g., Nelson et al., "RAKE and LNA-ISH reveal microRNA expression and localization in archival human brain," RNA 12: 187-191 (2006)). Serial brain tissue sections were obtained, and each section was processed to reveal the presence of a single miRNA species. In Nelson et al., "MicroRNAs (miRNAs) in Neurogenerative Diseases," Brain Pathology 18(1): 130-138 (2008), in situ hybridization was used to visualize miRNA in formalin-fixed paraffin-embedded (FFPE) brain tissue samples using chromogenic labeling techniques. As above, series tissue sections were obtained, and each tissue section was analyzed to detect a single species of miRNA therein. The use of serial tissue sections has also been reported in Wang et al., "Expression of miRNA miR-107," J. Neuroscience 28(5): 1213-1223 (2008), where in situ methods were used to image miR-24, miR-124, and miR-107 species of miRNA using chromogenic staining techniques to detect one of these species in each of the tissue sections.

The methods and systems disclosed herein can be used to detect miRNA in samples. Typically, miRNA are identified by acquiring a plurality of sample images (e.g., spectral images, such as fluorescence images) and then analyzing the images to obtain information about miRNA in the sample. FIG. 1 is a flow chart 100 showing steps for identifying miRNA in samples. In a first step 102, the sample is prepared for imaging. Preparation of the sample (e.g., cells, fixed tissue, fresh tissue) can include a variety of different sample treatment procedures. In some embodiments, sample preparation includes treating the sample with one or more fluorescent labels that bind to miRNA in the sample. For samples that include (or are suspected to include) multiple different types of miRNA to be imaged, sample preparation can include treatment with multiple different fluorescent labels, each of which selectively binds to one of the different types of miRNA. A wide variety of different fluorescent labels can be applied to samples including, but not limited to, fluorescein-based labels, rhodamine-based labels, Texas red, the Alexa fluorophores (available from Invitrogen, Eugene, Oreg.), cyanine dyes such as Cy3 and Cy5, and quantum dots. In general, any of these different types of labels, if chemically compatible, can also be used in combination.

Fluorescent labels are particularly advantageous relative to chromogenic stains with regard to multiplexed measurements of multiple labeled species in a single sample. As a result, by using fluorescent labels in samples, quantitative in situ detection of miRNA in samples—and even in portions of samples, such as individual cells—can be performed directly, rather than by inference. Further, detection of multiple labeled species can be performed, permitting assessment of multiple species of miRNA in a single sample, and even within a single portion of a sample such as a single cell. Further, detection of other labeled species, including other types of RNA (e.g., mRNA, siRNA), proteins, and oligosaccharides, can also be performed in a single sample or portion of a sample. Each of these different species—different types of miRNA, mRNA, siRNA, proteins, and oligosaccharides—can be qualitatively identified in samples, and also quantitatively measured using the methods and systems disclosed herein. As a result, the various types of miRNA present in a sample can be compared with other species in the sample to determine relationships between, for example, miRNA and various protein expression processes.

Typically, sample preparation step 102 does not include transfecting cells to increase miRNA abundance in the sample. Although the methods and systems disclosed herein can be used to identify miRNA in transfected cell samples, the methods and systems also permit identification of miRNA in non-transfected cells. Transfection increases the amount of miRNA that cells produce to increase the amount of miRNA signal in sample images. However, because transfection artificially increases the amount of miRNA in a sample, quantitative miRNA measurements derived from transfected cell samples can be compromised due to both the increase in miRNA production and to variability in the method of performing transfection and its effects in individual samples. The methods and systems disclosed herein permit quantitative identification and determination of miRNA and other species in samples; the quantitative measurements are not compromised by sample preparation procedures such as cell transfection, and therefore can be used to provide insight into cellular processes and disease dynamics.

In some embodiments, the systems and methods disclosed herein can be used to identify miRNA in samples that have not undergone qPCR amplification. By not performing miRNA amplification via qPCR methods, sample preparation can be significantly simplified. Further, where qPCR methods are used, quantitative measurements of miRNA in samples may be compromised by the uncertainty associated with the introduction of an amplification factor, and/or the comparative uncertainty that arises from sample to sample due to variations in the application and effects of qPCR methods. The methods and systems disclosed herein can perform quantitative measurements of miRNA in samples that are not affected by such variability by eliminating processing steps such as qPCR amplification. Nonetheless, the methods and systems disclosed herein can also be used with samples that have undergone qPCR amplification.

Following sample preparation, in step 104 of flow chart 100 a plurality of sample images are obtained to form an image stack. Methods and systems for obtaining spectral images of samples are generally disclosed, for example, in the following, each of which is incorporated by reference in its entirety: U.S. Pat. No. 7,321,791; and PCT Patent Application Publication No. WO 2005/040769. Typically, the sample images are spectral images—that is, images that correspond to measured radiation in a particular region of the electromagnetic spectrum. The spectral images typically include information (e.g., spectral information) about different fluorescing species in the sample. For example, if in step 102 two different fluorescent labels were applied to the sample, the images obtained in step 104 typically include fluorescence information about each of the different labels (e.g., fluorescence emission from each of the two labels). When the applied fluorescent labels selectively bind to different components of interest in the sample, the information about the labels corresponds to information about the components of interest in the sample. For example, by selectively applying different fluorescent labels to two different types of miRNA in a sample and then obtaining a plurality of fluorescence images of the labeled sample, the fluorescence images include information (e.g., quantity and distribution information) about the different types of miRNA.

In addition, the images obtained in step 104 can also include information about other components in the sample. In particular, many biological samples exhibit background fluorescence which is referred to as autofluorescence. In certain samples, therefore, autofluorescence can be one of the fluorescing species or components referred to above. For some samples that have been treated with fluorescent labels, the autofluorescence emission signal can be significantly stronger than the fluorescence signal due to any one or all of the fluorescent labels. As a result, direct visual detection of labeled species such as miRNA in fluorescence images—either by a human operator, or using conventional machine-vision tools—can be very difficult.

In general, the sample images obtained in step 104 include spectrally resolved information across a band of wavelengths in the electromagnetic spectrum. For example, in some embodiments, some or all of the sample images are red-green-blue (RGB) images that include spectral contributions in each of the red, green, and blue regions of the spectrum. The images can be measured with a detector (e.g., a CCD camera) with three different spectral channels corresponding to the red, green, and blue regions, respectively.

In certain embodiments, the images correspond to regions of the electromagnetic spectrum that are selected by a detection system. For example, the detection system used to obtain the images can include a variable filter (e.g., a liquid crystal filter) with a spectral passband that is tunable across a subset of wavelengths in the spectrum. Successive sample images can be obtained by tuning the filter to a new central passband wavelength prior to each measurement. The set of images obtained from this procedure forms a spectral image stack in which each image in the stack is a two-dimensional view of the sample's fluorescence emission in a different wavelength band.

After the sample images that form the image stack have been obtained in step 104, the image stack is decomposed in step 106 to obtain a component image that corresponds to a type of miRNA of interest in the sample. The component image corresponds substantially only to contributions from the miRNA species of interest to the measured fluorescence signals in the sample images. Typically, for example, the component image corresponds to the fluorescent label applied to the sample in step 102 that binds selectively to the miRNA species of interest. As such, the presence of the miRNA species in the sample can be identified based on the component image.

Component images can be obtained for multiple species of interest in the sample. For example, multiple labeled species of miRNA can be present in the sample, and component images corresponding to contributions to the fluorescence signal from each of the different miRNA species individually can be obtained. Component images corresponding to other labeled species in the sample such as mRNA, siRNA, proteins, and oligosaccharides can also be obtained in step 106. Further, component images corresponding to fluorescence emission from other localized components in the sample (e.g., unlabeled components) and from the entire sample (e.g., autofluorescence) can be obtained.

Different methods can be used to perform the decomposition in step 106. In some embodiments, when the sample images (e.g., spectral images) measured in step 104 correspond to RGB images, component images corresponding to spectral contributions from various labeled species in the sample can be obtained by decomposing the three color channels in the RGB images.

More generally, spectral images correspond to images of a sample at a range of different wavelengths within a selected wavelength region of the electromagnetic spectrum. Further, applied fluorescent labels can fluoresce across a relatively wide region of the spectrum, and different fluorescent labels can have characteristic fluorescence emission spectra that are different, but which overlap in certain regions of the spectrum. Moreover, biological samples frequently exhibit autofluorescence which can be higher in intensity than fluorescence due to labeled miRNA in the sample. To obtain component images for such samples, spectral unmixing methods can be used.

Spectral unmixing methods are generally disclosed, for example, in U.S. Pat. No. 7,321,791, and in PCT Patent Application Publication No. WO 2005/040769. Spectral unmixing is a procedure in which a spectrum (e.g., a fluorescence spectrum) that includes contributions from multiple different contributors is decomposed into spectral contributions from each of the components individually. The decomposed contributions from the components are often shown as images, each image corresponding to contributions from one of the components.

The spectral unmixing process uses estimates of the pure spectra of at least some of the sample components to perform the decomposition. These estimates can be obtained from reference data (e.g., a spectral library), specified by a system operator, or derived from the spectral images. The spectral images form a sequence of images $S(x, y, \lambda_i)$ (for i=1 to n, the number of images in the stack). The image stack therefore includes a full two-dimensional image of the sample for a given center wavelength $\lambda_i$, and a full spectrum at a given pixel (x,y) in the images. The discussion below is developed for a sample that includes one labeled miRNA species with a fluorescence emission spectrum $G(\lambda)$ in a sample with an autofluorescence spectrum $F(\lambda)$. The discussion can readily be generalized to include emission from more than one labeled component (e.g., species of miRNA, mRNA, siRNA, protein, and/or oligosaccharide), and/or more than one autofluorescence component.

The exact spectrum recorded at a given pixel in the image stack depends on the amount of labeled miRNA and sample autofluorescence, and on the two spectra, as:

$$S(x,y,\lambda)=a(x,y)*F(\lambda)+b(x,y)*G(\lambda) \quad [1]$$

where the (x, y) indices are used to denote a given pixel location in the images, the asterisk denotes multiplication, $\lambda$ is used to denote a given wavelength (or wavelength band) of emission or detection, $S(x, y, \lambda)$ denotes the net signal for a given pixel location and wavelength, $a(x, y)$ indicates the abundance of autofluorescence at a given (x, y) pixel location, and $b(x, y)$ indicates the abundance of labeled miRNA at a given (x, y) pixel location.

Equation [1] states that the net signal from a given pixel location is the sum of two contributions, weighted by the relative amount of autofluorescence and miRNA present. It is easier to see if one writes the above equation for a single pixel:

$$S(\lambda)=aF(\lambda)+bG(\lambda) \quad [2]$$

$F(\lambda)$ and $G(\lambda)$ may be termed the spectral eigenstates for the system because they correspond to the estimates of the pure spectra for the autofluorescence and labeled miRNA emission, which are combined in various amounts according to the amount of autofluorescence and miRNA, to produce an observed signal spectrum $S(\lambda)$. Thus, the signal spectrum is a weighted superposition corresponding to separate contributions from the autofluorescence and the labeled miRNA emission.

Now if the emission spectra of the autofluorescence and of the labeled miRNA are known (or can be deduced), one may invert equation [2] by linear algebra to solve for a and b, provided that the spectrum S has at least two elements in it; that is, provided one has data for at least two emission wavelengths $\lambda$. Equation [2] can be re-written as S=E A. Then we can write:

$$A=E^{-1}S \quad [3]$$

where A is a column vector with components a and b, and E is the matrix whose columns are the spectral eigenstates, namely [F G]. Using equation [3], one can take the observed signal spectrum and calculate the abundance of the autofluorescence and of the labeled miRNA sources (e.g., the components that produce autofluorescence and labeled miRNA emission) at each pixel location in the image stack. When this process is repeated for each pixel in the image stack, an image of labeled miRNA fluorescence emission that is free of contributions from autofluorescence can be obtained. As a result, the threshold fluorescence signal level that permits detection of labeled miRNA (or other species) in samples is greatly reduced, relative to the signal level that would ordinarily be required without spectral unmixing. During the spectral unmixing process, the matrix E need only be inverted once for a given set of autofluorescence and labeled miRNA spectra. Thus, the calculation of abundances is not burdensome and can be readily done in nearly real-time by an ordinary electronic processor (e.g., a processor in a personal computer).

As a result of the spectral unmixing process, a component image corresponding substantially only to contributions from the miRNA species of interest to the measured fluorescence images is obtained. Component images corresponding to other labeled species, and to autofluorescence, can also be obtained. In step 108, the miRNA species of interest is identified in the sample based on the component image. In some embodiments, the identification of miRNA can simply involve displaying the component image, and/or storing the component image as numerical data. Regions of non-zero pixel intensity in the component image correspond to miRNA in the sample. Thus, a qualitative identification of the presence of the miRNA species of interest in the sample can be made based on its component image.

Quantitative measurements can also be obtained as part of the identification of the miRNA. For example, in some embodiments, the amount of miRNA in the sample (or in portions of the sample, such as in individual cells) can be estimated by integrating pixel intensities in the sample (or portions thereof). The integrated pixel intensities can be converted to concentration measures for the miRNA in the sample by reference to conversion tables and/or experimentally determined conversion factors, for example.

In certain embodiments, the distribution of miRNA in the sample can be determined from the pixel intensities in the component image. Further, the distribution of miRNA in each of multiple portions of the sample—such as certain cells within the sample—can be determined. Thus, for example, information about distributions of a particular type of miRNA in different sample cells can be obtained. Further, when a sample includes multiple different types of miRNA and/or other components, the distributions of the other types of miRNA and/or other components in the sample and/or in selected portions of the sample can be determined. Statistical measures can be calculated from the distribution of miRNA and/or other components, yielding values for the mean, standard deviation, variance, entropy, higher-order moments, and other statistical measures derived from the distribution(s). Any of these measures can be converted to concentration, mass, or other units by referring to conversion tables or experimentally determined conversion factors, as discussed above.

Following identification of the miRNA (and, in certain embodiments, other components) in the sample, the procedure shown in flow chart 100 terminates at step 110. In some embodiments, however, information obtained regarding miRNA and/or other components in a sample can be used in additional applications. For example, some samples can be classified according to information derived from one or more component images. The component images provide not only quantitative information about the amount of various components in the same, but also information about the distribution of each of the components in the sample and in particular, the distribution of each of the components within selected regions of the sample such as individual cells. As such, the component images contain textural information about miRNA and other sample components that can be used for classification.

A wide variety of different classification algorithms can be used to classify samples based on miRNA component images. In particular, texture-based classification algorithms can be particularly efficient at classifying such samples. Further, texture-based classification algorithms permit multiple different classification steps according to different emitting components within a sample. Suitable texture-based classification methods and systems are disclosed, for example, in U.S. Pat. No. 7,555,155, and in U.S. patent application Ser. No. 12/401,430 filed on Mar. 10, 2009, the contents of each of which are incorporated herein by reference in their entirety.

As an example of texture-based classification methods applied to samples that include miRNA to classify cells in the sample based on the presence of miRNA therein, a sample containing miRNA can be treated with a fluorescent label that selectively binds to the miRNA. The sample can also be treated with one or more counterstains such as hematoxylin and eosin. Typically, counterstains bind to cellular structures such as nuclei, and can be used to identify the presence and location of individual cells in a sample.

Following sample preparation, a plurality of images of the sample are obtained. The images can include fluorescence images, which include contributions from the labeled miRNA and sample autofluorescence, for example. If the applied counterstain is a chromogenic stain, the plurality of images can also include one or more reflection or transmission images of the sample that include information about incident light that is absorbed by the applied counterstains.

Once the sample images have been obtained, the image stack is decomposed to obtain images corresponding to the various components in the sample. In particular, the images can be decomposed to yield a component image corresponding substantially only to spectral contributions from the labeled miRNA. Further, the images can be decomposed to yield a component image(s) corresponding substantially only to spectral contributions from the applied counterstain(s). In some embodiments, this decomposition can be performed entirely in a single step, with all component images determined in a single decomposition operation.

In certain embodiments, determination of the component images by decomposition is a two-step process. In a first step, the transmission and/or reflection images of the sample (e.g., corresponding to contributions from chromogenic species in the sample) are decomposed to obtain component images corresponding to each of the applied counterstains. In a second step, the fluorescence images of the sample are decomposed to obtain component images corresponding to each of the various fluorescently-labeled species in the sample, including miRNA, mRNA, siRNA, proteins, and oligosaccharides. As an example, the first step of the decomposition can be used to obtain component images that correspond to fluorescing components other than miRNA. In the second step, component images that correspond to miRNA can be obtained. The Nuance software that accompanies the Nuance FX® imaging system (available from Cambridge Research & Instrumentation, Woburn, Mass.) has a "baseline subtract" feature that removes certain contributions—particularly, background "haze"—from sample images. The removed contributions can correspond, for example, to sample autofluoresce, and to contributions from one or more non-miRNA fluorescing entities in a sample. The software then permits decomposition of the baseline-subtracted image stack to obtain component images corresponding to labeled miRNA in the sample.

The one or more component images that correspond to the applied counterstain(s) can be used to identify particular cells in the sample. For example, as discussed above, counterstains tend to aggregate in cell nuclei. Thus, the component images that correspond to the applied counterstain(s) can be used to identify the location of individual cells in the sample. Information derived from such images can be used to create a map of the various cells in a sample.

Next, the component images that correspond to miRNA and/or other components can be used to classify cells in the sample into one of several classes. For example, within each of the identified cells in the map, information about the amount and distribution of one or more different types of miRNA in the cells can be determined. Both one-dimensional and two-dimensional statistical measures and/or textural measures can be determined based on the distribution(s). On the basis of these measures (for one or more different types of miRNA, for example), each of the cells can be classified by a suitably trained neural network or other machine-based classifier.

Cells in a sample can also be independently classified into one of several classes on the basis of information derived from different component images. For example, sample cells can be classified first based on information derived from a component image corresponding to a first type of miRNA in the sample. Sample cells can then be classified a second time based on information derived from a component image corresponding to a second type of miRNA in the sample. Correlations between the distribution of different components in individual cells, and the resulting classification of such cells, can be used to infer information about the properties of such cells and any abnormal conditions therein.

To evaluate the effectiveness of the methods and systems disclosed herein, a first set of exploratory experiments was performed. A set of four locked nucleic acid (LNA) probes was used to assess miRNA levels in brain tissue sections. Under standard fluorescence imaging conditions, each of the samples appeared to be negative for miRNA—no fluorescence signal due to miRNA was apparent. Conventional methods therefore led to the conclusion that either no miRNA was present in the samples, or that there had been some problem in the chemistry associated with the binding or hybridization which had led to a failure to deposit fluorescent label material in the sample. Similar results were obtained for a number of different samples. Fluorescence signals due to miRNA were not directly observable, and therefore, the miRNA concentration and/or distribution in each of the samples could not be determined.

When multispectral imaging methods (including spectral unmixing to decompose spectral images of the samples) were applied to the measurement of miRNA in the same samples, several sample features were apparent. First, the multispectral data confirmed that in all samples, there was strong autofluorescence background signal distributed over a wide spectral range, including the wavelengths associated with the miRNA probe label. Second, the multispectral imaging methods—and the data obtained therefrom—showed that the autofluorescence background signal was strong enough to visually obscure any miRNA probe label fluorescence signal.

However, quantitative analysis of the multispectral data revealed that one of the four labeled samples was miRNA-positive—that is, the sample included labeled miRNA, which, under fluorescence imaging conditions, produced a miRNA fluorescence signal that could be separated from the autofluorescence background and accurately quantified.

Based on these results, two additional experimental studies were performed to further investigate the effectiveness of the methods and systems disclosed herein. In a first study, samples of human hippocampus tissue were processed to receive a fluorescent probe for miRNA using the sequence of steps outlined below. Samples not receiving the probe were used as negative controls. Sections were cut from a human brain (preferably <5 hours PMI) into cassettes at 3-5 mm thickness, incubated overnight in 4% paraformaldehyde, followed by 20% sucrose overnight. Sections were then cut at 20 microns on a freezing microtome onto Probe-On slides. Slides were stored at −80° C. until used, at which time they were allowed to thaw at room temperature for 20 minutes prior to staining.

The in situ hybridization method used was similar to that described in Wang et al., J. Neuroscience 28(5): 1213-1223 (2008). However, in the present study, a fluorescent labeled probe (Exiqon, Inc., probe p/n 500150, has-miR-320, with 5'-mod Cy3 and synthesis sequence tcgccctctcaacccagctttt) was used. Further washing and incubation steps were done with avoidance of bright light. This was followed by two quick washes in 0.2% glycine in PBS. The tissues were washed twice in PBS (30 seconds), followed by fixing in 10% formaldehyde (10 minutes). This step was followed by two 10 second PBS washes. The tissues were then acetylated in a mixture of acetic anhydride, triethanolamine, and HCl (e.g., to 48 mL of distilled water, add 250 µL of HCl, 300 µL of acetic anhydride, and 670 µL of triethanolamine). This step was followed by a series of PBS washes (5 times, 30 seconds each) and then the tissues were washed twice in 5×SSC (30 seconds each). The tissues were then subjected to a 3 hour pre-hybridization in pre-hybridization buffer while in a moist hybridization chamber, at 37° C. Both pre-hybridization and hybridization were performed using plastic incubation mini-chambers (EM Sciences, 200 uL chambers, cat #70324-20). The pre-hybridization buffer included 650 mL formamide, 250 ml 20×SSC, 1 mL Tween 20, and 100 µg/mL yeast RNA. For hybridization, 10 µL of 3 µM fluorescent labeled probe was diluted in 600 µL of PHB (pre-hybridization buffer). Hybridization was performed for overnight at 37° C.

The hydridization cover-glass was removed carefully and the tissue was subjected to two washes of 5×SSC at 37° C. (5 minutes each). This step was followed by two washes of 50% formamide and 2×SSC at 37° C. (20 minutes each), and PBST (0.1% Tween 20; 3 minutes each). Slides were then rinsed briefly in distilled water and mounted in a water based, anti-fade-containing, fluorescent mounting medium.

Each of the samples (e.g., labeled and unlabeled) was imaged with an Axioplan II microscope (available from Carl Zeiss, Oberkochen, Germany), using a 40×0.95 NA Plan-NeoFluor objective. The filter set (excitation, barrier, and dichroic, available from Semrock, Rochester, N.Y., part number Cy3/Cy5-A-000) used produced a double-band excitation over the ranges 513-553 nm and 617-653 nm, and a double-band emission over the ranges 562-590 nm and 663-718 nm. A 50 W mercury lamp was used as a source of excitation light.

Sample images were obtained with a Nuance FX® system (available from Cambridge Research & Instrumentation, Woburn, Mass.), running Nuance version 2.6.0 software to acquire and analyze the images on a personal computer. Images were recorded every 10 nm over a spectral range of 560-720 nm, yielding an image stack with 17 sample images in different wavelength bands, each image having a pixel resolution of 1040×1392, for each of the two samples (labeled sample and negative control).

Figure 2A:
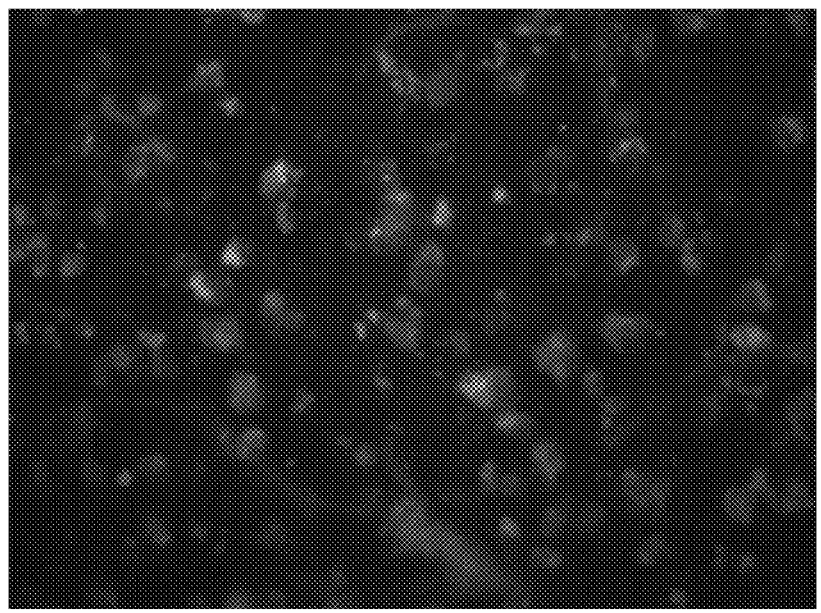
FIGS. 2A and 2B are images of serial sections of fresh frozen human hippocampus tissue. The section shown in FIG. 2A is labeled for miRNA-320 using Exiqon part number 500150, 5'-mod Cy3 fluor, with synthesis sequence tcgccctct-caacccagctttt. The section shown in FIG. 2B is an unlabeled negative control sample.
Figure 2B:
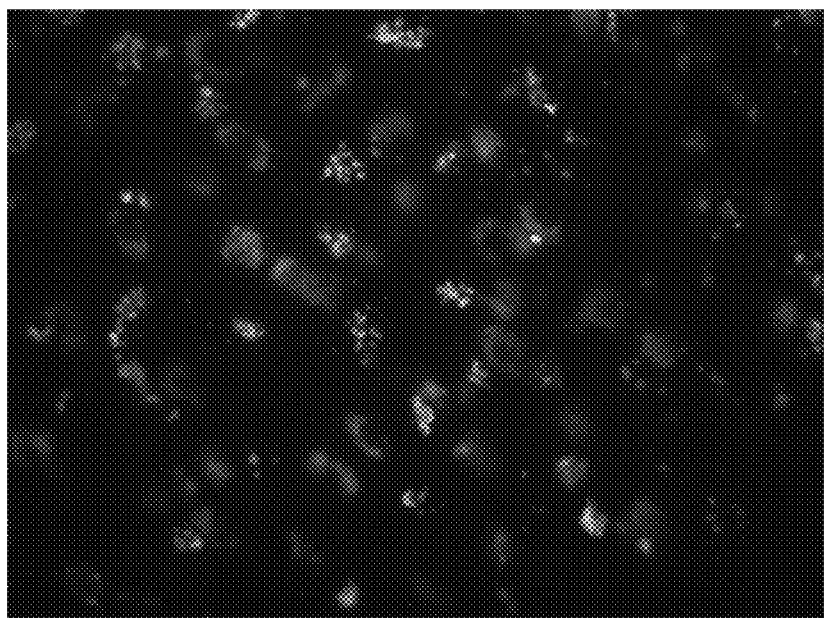

FIGS. 2A and 2B are fluorescence images of the labeled sample and the negative control sample, respectively. Each image includes relatively strong fluorescence emission due to autofluorescence; autofluorescence levels between the two samples were not readily distinguishable. Attempts to determine the presence or absence of miRNA-320 in these samples using standard optical inspection and/or analysis methods were not successful.

Figure 3A:
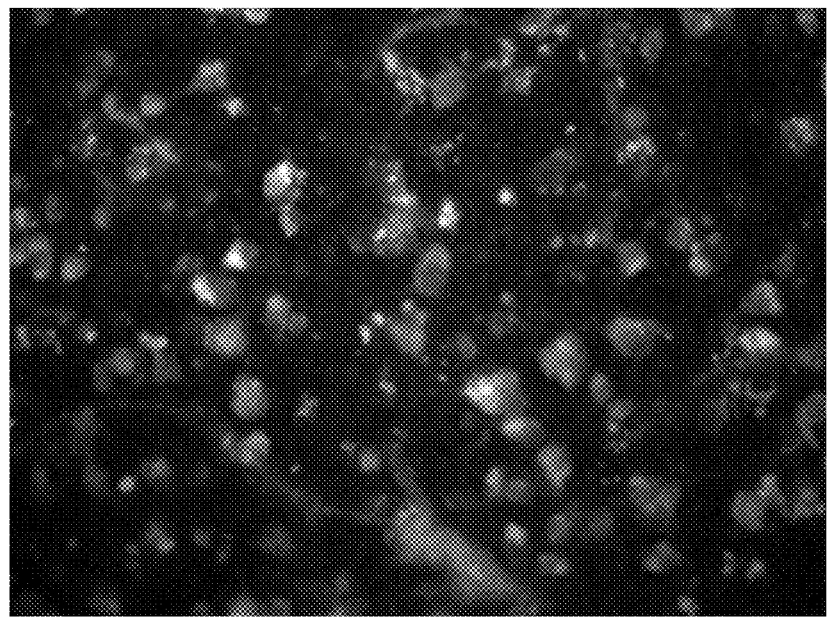
FIGS. 3A and 3B are fluorescence images of the samples shown in FIGS. 2A and 2B, respectively, at a detection wavelength of 580 nm, which corresponds to a maximum intensity of Cy3 fluorescence emission.
Figure 3B:
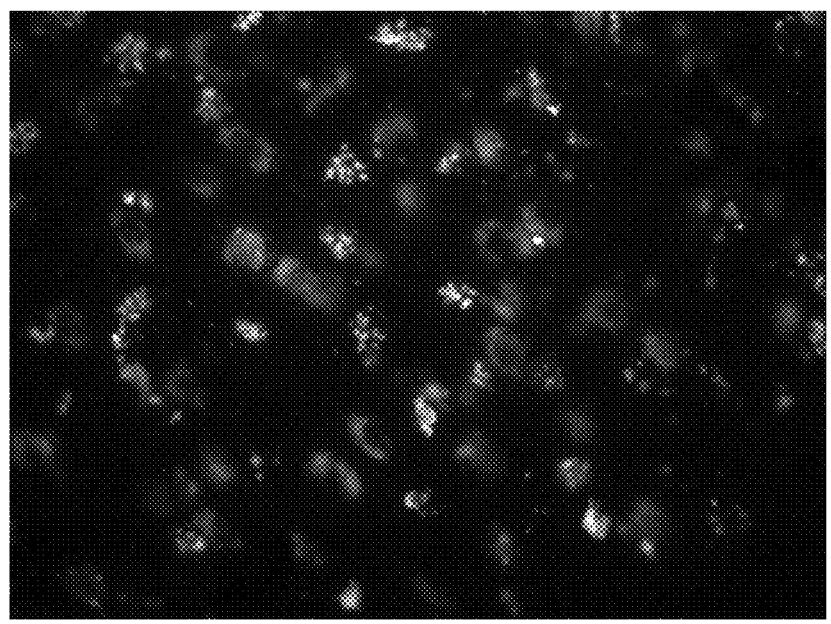

The peak emission wavelength for Cy3 fluorescence is in the range near 580 nm. However, even when imaged at this wavelength where it might be expected that the miRNA-320 signal would be most readily observed, the labeled sample (shown in FIG. 3A) and the unlabeled sample (shown in FIG. 3B) have comparable appearance and comparable signal strength. As a result, successful identification and quantification of the miRNA-320 material could not be achieved.

Figure 6:
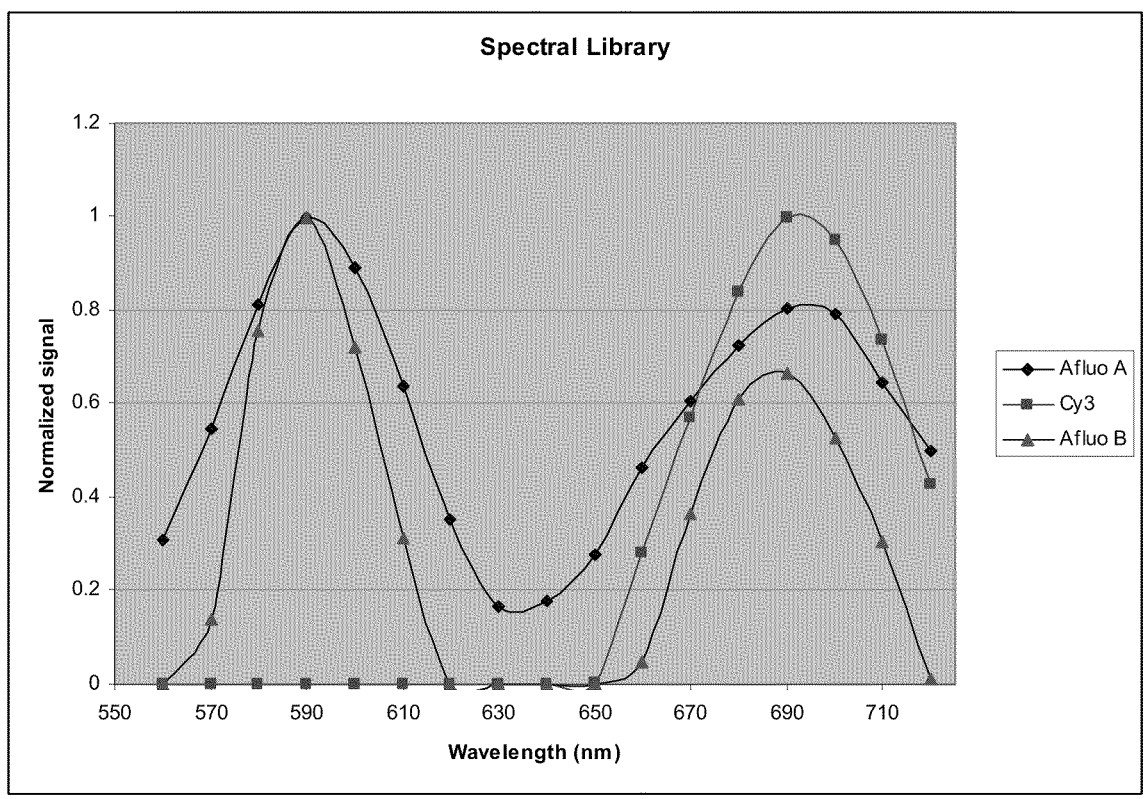
FIG. 6 is a plot showing a spectral library used for spectral unmixing analysis of fluorescence images of the sections shown in FIGS. 2A and 2B.

Spectra corresponding to estimates of pure spectra for two different types of autofluorescence from the sample, and to the pure spectrum of the Cy3 label, were entered into the Nuance software. These spectral estimates together formed a spectral library corresponding to the components in the sample. FIG. 6 shows the members of the spectral library used in the analysis. In general, the spectral library includes spectral estimates for each of the emitting components in the sample. Thus, the library shown in FIG. 6 includes estimates for the emission of Cy3-labeled miRNA, and for two different types of autofluorescence. If the sample included an additional labeled component (e.g., a different type of miRNA labeled with a different fluorescent label), the library shown in FIG. 6 would also include a spectral estimate for the fluorescence emission of the second labeled component. Generally, a spectral library can include any number of spectral estimates for emitting components in a sample, depending upon the nature of the sample.

Using the spectral library of FIG. 6, the image stacks for each of the two tissue sections (labeled and negative control) were spectrally unmixed into components corresponding to the two different types of autofluorescence and the Cy3 label. Component images for each tissue section were constructed, using the Nuance software to assess the signal levels associated with the autofluorescence components (referred to as autofluorescence A and B) and the Cy3 component associated with miRNA-320.

Figure 4A:
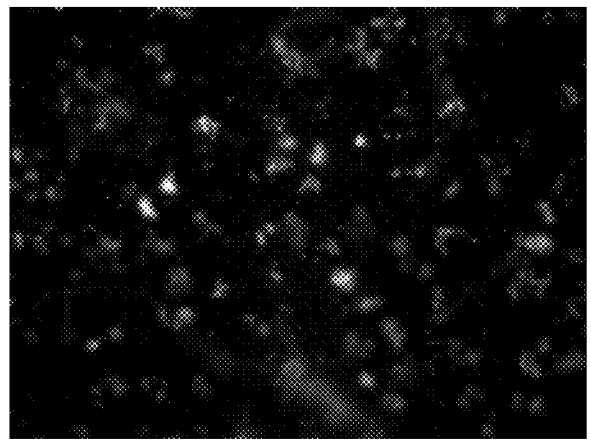
FIGS. 4A, 4B, and 4C correspond to a first spectrally unmixed autofluorescence component, a second spectrally unmixed autofluorescence component, and a spectrally unmixed Cy3 fluorescence component derived from the fluorescence image shown in FIG. 3A for the labeled tissue section.
Figure 4B:
Figure 4C:
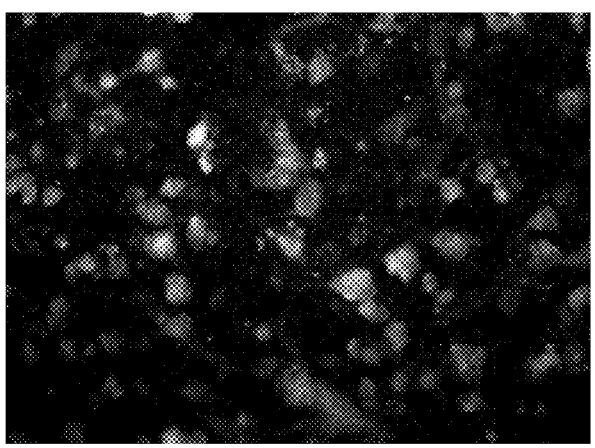
Figure 5A:
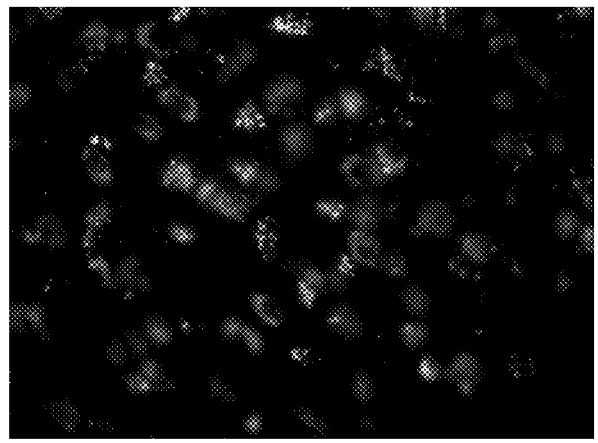
FIGS. 5A, 5B, and 5C correspond to a first spectrally unmixed autofluorescence component, a second spectrally unmixed autofluorescence component, and a spectrally unmixed Cy3 fluorescence component derived from the fluorescence image shown in FIG. 3B for the unlabeled negative control sample.
Figure 5B:
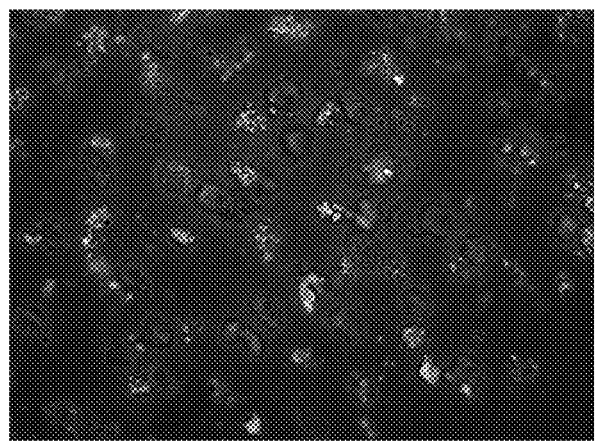
Figure 5C:
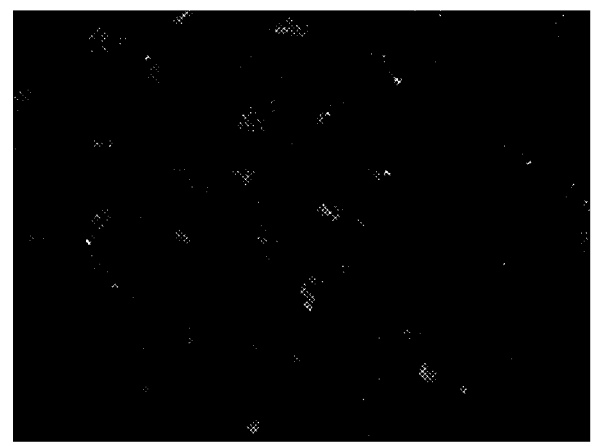

The autofluorescence A and B components and the Cy3 component for the labeled tissue section are shown in FIGS. 4A, 4B, and 4C, respectively. The autofluorescence A and B components and the Cy3 component for the unlabeled tissue section are shown in FIGS. 5A, 5B, and 5C, respectively. In the labeled sample, miRNA-320 is present in many of the cells, as shown in FIG. 4C. Regions that were considered to be positive for miRNA-320 (e.g., threshold fluorescence intensity of 31 counts or more) had a mean fluorescence signal intensity of 53.2 counts for the component associated with Cy3. The same regions have a mean signal intensity of 350.0 counts associated with autofluorescence A, and a mean signal intensity of 150.7 counts associated with autofluorescence B, as shown in FIGS. 4A and 4B, respectively. Accordingly, the unmixed component images show that the methods and systems disclosed herein permit fluorescence signals due to labeled miRNA to be detected, even when the average intensity of such signals is significantly smaller than other fluorescence emission from the sample, including autofluorescence.

In the unlabeled negative control sample, there was relatively little signal intensity in the fluorescence component associated with Cy3, as shown in FIG. 5C. Regions that were positive for miRNA (based on a threshold signal intensity of 31 counts associated with Cy3 emission) had a mean fluorescence signal intensity of 60.1 counts. The same regions had a mean signal intensity of 473.1 counts associated with autofluorescence A, and a mean signal intensity of 588.3 counts associated with autofluorescence B, as shown in FIGS. 5A and 5B, respectively. Comparing FIGS. 4C and 5C, it is evident that the systems and methods disclosed herein permit accurate and sensitive fluorescence detection of miRNA in samples, even when the fluorescence signals due to miRNA are relatively weak.

In a second study, sections of human hippocampus tissue similar to those used in the first study were processed with Thioflavine S, which selectively binds to amyloid plaques containing fibrillar material, a major defining neuropathological feature of Alzheimer's disease (AD) and other tangle-bearing disorders. The tissue sections were washed in distilled water twice for 5 minutes. Next, racked sections were incubated in 0.05% Thioflavine S in 50% ethanol in the dark for 8 minutes. Sections were then washed twice with 80% ethanol (10 seconds each), followed by four washes in distilled water (30 seconds). Sections not treated with Thioflavine S were used as negative controls.

Figure 7A:
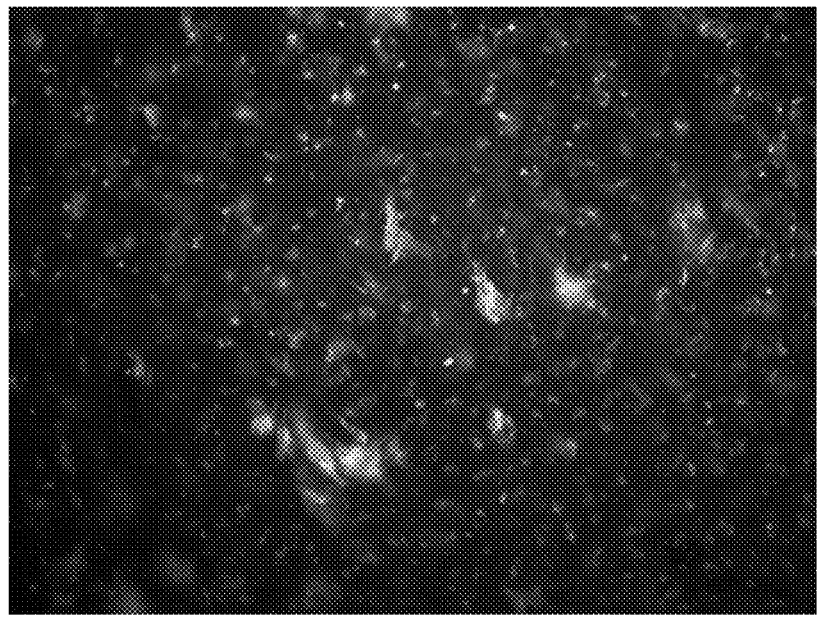
FIGS. 7A and 7B are images of serial sections of fresh frozen human hippocampus tissue. The section shown in FIG. 7A is stained with Thioflavine S, and the section shown in FIG. 7B is an unstained negative control sample.
Figure 7B:
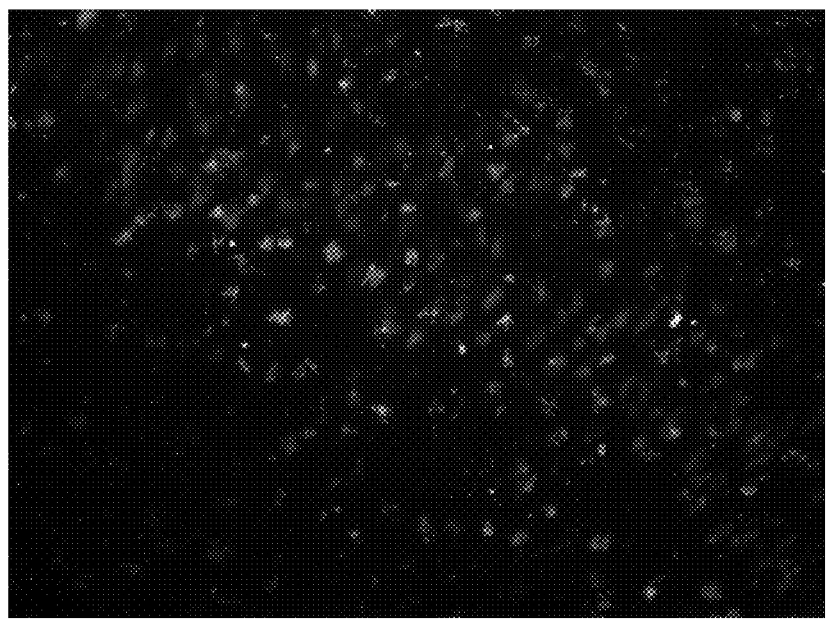

Two samples (one stained, one negative control) were imaged using the same fluorescence imaging system described above in the first study, except that an Omega Optical XF02-2 filter set (excitation, barrier, and emission filters) was used. This filter set provided UV excitation at 330-380 nm, with a 420 nm long-pass emission response. Fluorescence emission for each sample was measured over the range 420-700 nm, in 10 nm steps. The result was an image stack with 29 sample images in different wavelength bands, each image having a spatial resolution of 1040×1392 pixels, for each of the two samples. FIGS. 7A and 7B show representative fluorescence images of the labeled and unlabeled samples, respectively.

Figure 8A:
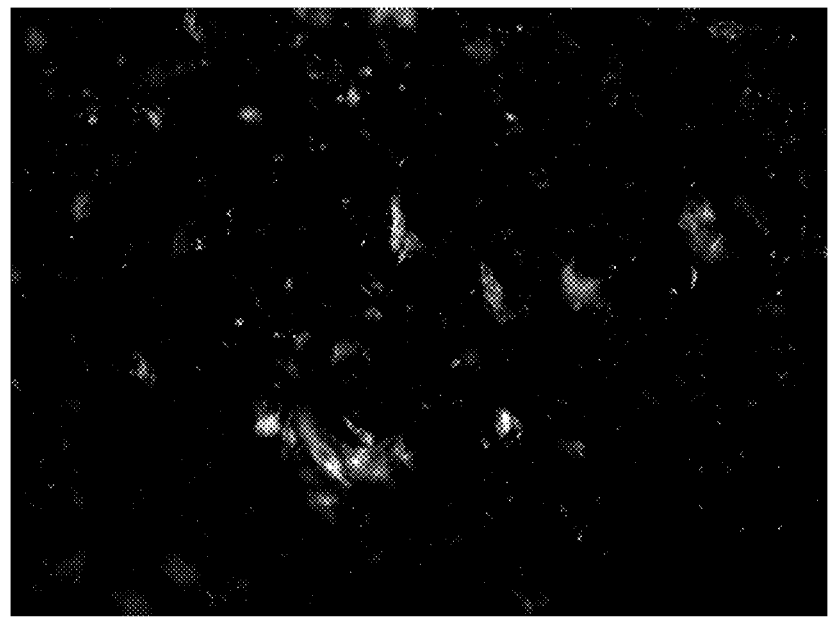
FIGS. 8A and 8B show the unmixed spectral component corresponding to Thioflavine S for each of the sections of FIGS. 7A and 7B, respectively.
Figure 8B:
Figure 9:
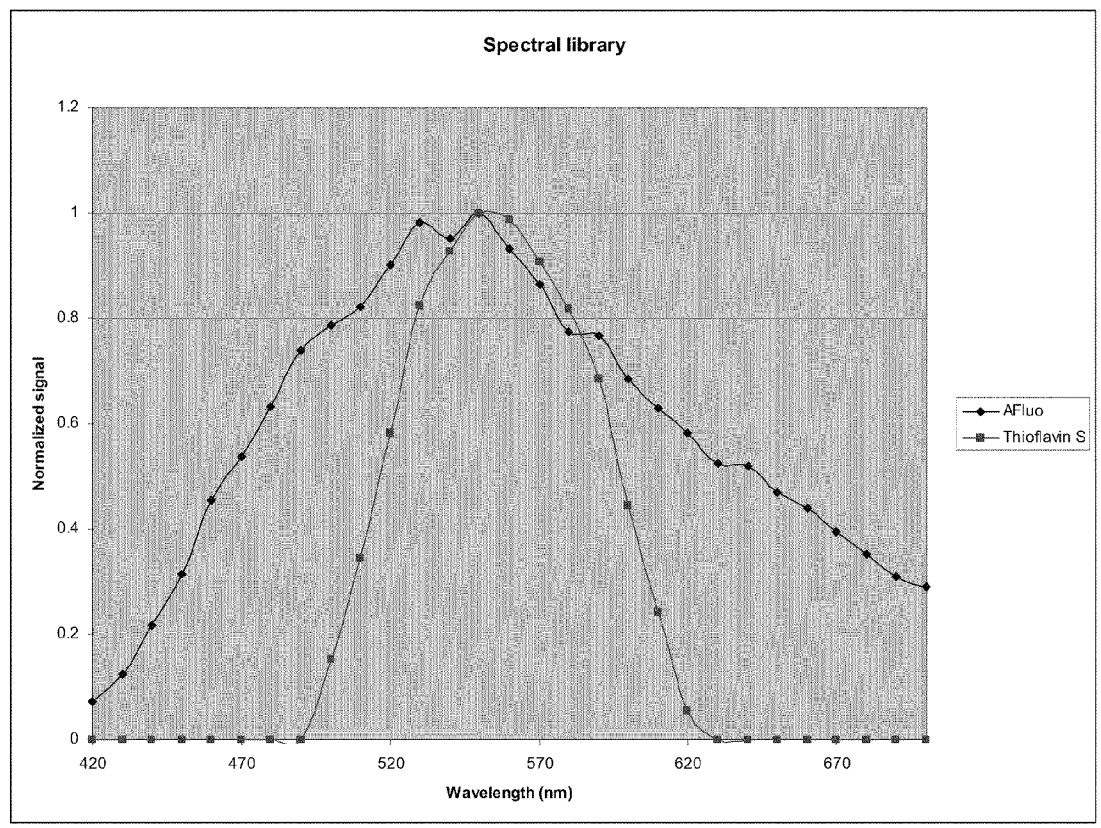
FIG. 9 is a plot showing a spectral library used for spectral unmixing analysis of fluorescence images of the sections shown in FIGS. 7A and 7B.

The spectral images were analyzed using the Nuance software with a spectral library that included one autofluorescence component and one component corresponding to fluorescence emission of Thioflavine S. FIG. 9 shows the spectral library that was used for analysis of the samples. FIGS. 8A and 8B show unmixed images of the labeled and unlabeled samples, respectively, that correspond to the Thioflavine S component. Thioflavine is readily evident in the treated sample (FIG. 8A), while the negative control sample has little or no such signal (FIG. 8B). Accordingly, components other than miRNA (e.g., plaques) can be readily identified and quantified following spectral unmixing of the image stack corresponding to the labeled sample.

Note that although in these studies the spectral images were decomposed to obtain only two or three component images, the Nuance software can decompose such images to obtain up to ten different component images. More generally, however, the number of component images that can be obtained from a set of spectral images is essentially unlimited, provided that the spectral signatures of the individual components are separable. In particular, when a sample includes more than one component of interest, such as two or more different types of miRNA, or one type of miRNA and one or more additional components of interest such as mRNA, siRNA, proteins, and/or oligosaccharides, different fluorescent labels can be used to selectively bind to each of the different components. Provided that the different labels have fluorescence emission spectra that are separable, individual component images for each of the component images can be obtained.

As an example, the methods of the first and second studies discussed above can be combined to identify both miRNA and amyloid plaques in a sample. A sample can be treated with both a fluorescent label (e.g., Cy3) that binds specifically to miRNA, and with a fluorescent label (e.g., Thioflavine S) that binds specifically to plaques. Spectral images of the labeled sample can be obtained and then spectrally unmixed to yield individual component images corresponding to emission from both the labeled miRNA and the labeled plaques, thereby providing information about both components in the sample. Inferences related to the interdependence of the roles of the components in the sample's biological function may be drawn based on the presence and distribution of the components.

The methods and systems disclosed herein can be used to obtain information about multiple components in a sample even when the components (and their fluorescence emission) are partially co-localized. For example, referring to FIGS. 4A-4C, the Cy3 fluorescence emission shown in FIG. 4C is partially co-localized with autofluorescence emission by the sample shown in FIGS. 4A and 4B. This co-localization does not, however, prevent the spectral unmixing process from isolating contributions from each of the fluorescence components individually. If a second labeled component (e.g., another type of miRNA, selectively labeled with a different fluorescent label) was present in the sample, a component image corresponding to that component would also be obtained, even if the second component was partially co-localized with the first component. Spectral unmixing techniques can be used to accurately determine contributions from each of the labeled components present in the sample, even if the components occupy common spatial locations in the sample images.

In some embodiments, the systems and methods disclosed herein can be used for the evaluation of sample preparation procedures. That is, the systems and methods can be used to determine, for example, where one or another of several different sample preparation protocols yields the most intense fluorescence signal for a component of interest in the sample. Often during development of sample preparation procedures, it can be difficult to detect whether any label binding has occurred, particularly in the early phase of development. To evaluate two different preparation procedures, for example, a first sample is prepared according to a first procedure, which includes labeling a species of interest (e.g., miRNA) in the first sample with a fluorescent label. A second sample is prepared according to a second procedure, which includes labeling a species of interest in the second sample with a fluorescent label. Spectral images for both the first and second samples are measured, and an image stack is constructed for each. Each of the image stacks is then decomposed (e.g., by spectral unmixing) to obtain component images corresponding to the first and second species. By comparing the component images, one or the other of the procedures can be identified as the preferred procedure. Criteria for determining which procedure is preferred can include, for example, selecting the procedure that yields the component image with the highest total integrated intensity and/or selecting the procedure that yields a particular preferred distribution of the species of interest in the component images. The evaluation of different procedures can occur multiple times during development of an overall preparation protocol where there are procedural choices to make at multiple different points in the protocol. In this way, spectral imaging of species of interest (such as miRNA) can be used to guide development of sample preparation procedures.

Evaluation of different procedures can also be based on measurements of other components in samples, in addition to (or as an alternative to) miRNA. For example, samples can include multiple different species of interest, such as one species of miRNA, and a second component that can include a different species of miRNA, a species of mRNA, a species of siRNA, a class or type of protein, or a class or type of oligosaccharide. During the first procedure, a second label can be applied to the first sample to selectively bind to the second species; similarly, during the second procedure, the second label can be applied to the second sample to selectively bind to the second species. Spectral images of the two samples can be acquired and decomposed to obtain individual component images corresponding to the first species and to the second species in each of the first and second samples. An appropriate procedure can be selected by considering the component images corresponding to each of the species for each sample. For example, a procedure that is selected can be the procedure that yields the highest combined signal for both species one and species two. The selected procedure can be the one that yields distributions of both species one and species two that satisfy certain criteria (e.g., uniformity), for example. Moreover, to select a particular procedure, threshold conditions can be applied that have to be satisfied by both component images. For example, a threshold intensity condition can be applied that stipulates that for each of two species in a sample, the total integrated intensity (determined from each corresponding component image) must be larger than a threshold value. The corresponding procedure is not selected unless the threshold requirement is satisfied for both components.

Other Embodiments

A number of embodiments have been described. Nevertheless, it will be understood that various modifications may be made without departing from the spirit and scope of the disclosure. Accordingly, other embodiments are within the scope of the following claims.

What is claimed is:

1. A method of identifying microRNA labeled with a fluorescent probe in a biological sample, the method comprising:
    obtaining the sample as a tissue section, wherein the sample is not transfected to enhance production of the microRNA;
    obtaining a plurality of fluorescence images of the sample and forming an image stack based on the plurality of fluorescence images;
    decomposing the image stack to obtain a component image that corresponds to the labeled microRNA; and
    identifying the microRNA based on the component image.

2. The method of claim 1, wherein the decomposing further comprises obtaining at least one component image that corresponds to autofluorescence of the sample.

3. The method of claim 1, wherein the labeled microRNA comprises in situ microRNA, and the component image corresponds to the in situ microRNA in the sample.

4. The method of claim 1, wherein identifying the microRNA comprises displaying an image derived from the component image.

5. The method of claim 1, wherein identifying the microRNA comprises identifying regions of the component image having an intensity level larger than a non-zero threshold intensity level.

6. The method of claim 1, wherein the decomposing comprises obtaining additional component images, each of the additional component images corresponding to other components in the sample.

7. The method of claim 6, wherein the other components comprise at least one different type of microRNA.

8. The method of claim 7, wherein each of the different types of microRNA is labeled with a different fluorescent probe.

9. The method of claim 8, wherein the decomposing comprises, for each of the different types of microRNA, obtaining at least one additional component image corresponding to the different type of microRNA.

10. The method of claim 6, wherein the other components comprise at least one of messenger RNA, small interfering RNA, proteins, and oligosaccharides.

11. The method of claim 6, further comprising displaying at least one image derived from the additional component images.

12. The method of claim 11, further comprising identifying at least some of the other components in the sample based on the at least one image derived from the additional component images.

13. The method of claim 12, wherein identifying at least some of the other components comprises identifying one or more of the other components that are at least partially co-localized with the microRNA in the fluorescence images.

14. The method of claim 1, wherein each of the fluorescence images comprises spectral contributions in one or more of the red, green, and blue regions of the electromagnetic spectrum.

15. The method of claim 14, wherein decomposing the image stack comprises separating one or more of the fluorescence images into contributions in one or more of the red, green, and blue regions of the electromagnetic spectrum.

16. The method of claim 1, wherein decomposing the image stack comprises spectrally unmixing the image stack.

17. The method of claim 1, wherein identifying the microRNA comprises determining a concentration of the microRNA in the sample based on pixel intensity values in the component image.

18. The method of claim 1, wherein identifying the microRNA comprises determining a distribution of the microRNA in the sample based on the component image.

19. The method of claim 18, further comprising determining one or more statistical measurements based on the distribution of the microRNA in the sample.

20. The method of claim 1, wherein the sample comprises a plurality of cells, and identifying the microRNA comprises identifying microRNA in each of one or more of the plurality of cells.

21. The method of claim 6, wherein the sample comprises a plurality of cells, and each of one or more of the plurality of cells comprises at least some of the other components.

22. The method of claim 21, wherein the at least some of the other components comprises different types of microRNA.

23. The method of claim 1, wherein the decomposing is performed based on an estimate of spectral contributions of the labeled microRNA to the fluorescence images.

24. The method of claim 23, wherein the decomposing is performed based on an estimate of spectral contributions of at least one additional component in the sample to the fluorescence images.

25. The method of claim 1, wherein the decomposing is performed based on an estimate of spectral contributions due to sample autofluorescence to in the fluorescence images.

26. The method of claim 1, further comprising classifying the sample based on the component image.

27. The method of claim 26, wherein the classifying comprises:
   prior to obtaining the images, applying at least one counterstain to the sample;
   decomposing the image stack to obtain a component image corresponding to the at least one counterstain; and
   classifying the sample based on the component images that correspond to the microRNA and the counterstain,
   wherein the plurality of fluorescence images comprises contributions from the at least one counterstain.

28. The method of claim 26, wherein the classifying comprises:
   prior to obtaining the images, applying at least one counterstain to the sample;
   obtaining a second plurality of images of the sample based on incident radiation that is transmitted by or reflected from the sample, the second plurality of images comprising contributions from the at least one counterstain;
   decomposing the second plurality of images to obtain a component image that corresponds to the at least one counterstain; and
   classifying the sample based on the component images that correspond to the microRNA and the counterstain.

29. The method of claim 27, wherein the at least one counterstain selectively binds to one or more structural features in the sample.

30. The method of claim 29, wherein the one or more structural features comprise cell nuclei.

31. The method of claim 27, wherein the component image corresponding to the at least one counterstain comprises information about the positions of cells in the sample, and the component image corresponding to the microRNA comprises information about microRNA in the cells.

32. The method of claim 31, wherein the classifying comprises classifying each of multiple cells in the sample based on information about miRNA microRNA in the cells.

33. A method, comprising:
   obtaining first and second biological samples as tissue sections, wherein the first and second samples comprise microRNA and are not transfected to enhance production of the microRNA;
   applying a first fluorescent probe in a first sample preparation procedure to the first sample to label the microRNA;
   applying a second fluorescent probe in a second sample preparation procedure to the second sample to label the microRNA;
   obtaining a plurality of fluorescence images of the first and second samples;
   decomposing the plurality of fluorescence images to obtain component images corresponding to the microRNA in the first and second samples; and
   selecting one of the first and second procedures based on the component images.

34. The method of claim 33, wherein the selecting comprises identifying regions in each of the component images having an intensity level larger than a non-zero threshold intensity level.

35. The method of claim 33, further comprising, for each of the component images, determining a total fluorescence intensity corresponding to microRNA, and selecting the first or second procedure based on the total fluorescence intensities.

36. The method of claim 33, further comprising, for each of the component images, determining a distribution of the microRNA in the sample based on the component image, and selecting the first or second procedure based on the distributions.

37. The method of claim 33, wherein the decomposing comprises, for each of the samples, obtaining additional component images, each of the additional component images corresponding to components in the sample other than the microRNA.

38. The method of claim 37, further comprising, for each of the samples, identifying one or more of the other components in the sample based on the additional component images, and selecting the first or second procedure based on information derived from the additional component images.

39. The method of claim 33, wherein the first and second fluorescent probes are the same.

40. A method, comprising:
   applying a first fluorescent probe in a first sample preparation procedure to a first biological sample comprising microRNA to label the microRNA;
   applying a second fluorescent probe in a second sample preparation procedure to a second biological sample comprising microRNA to label the microRNA;
   obtaining a plurality of fluorescence images of the first and second samples;
   decomposing the plurality of fluorescence images to obtain component images corresponding to the microRNA in the first and second samples; and
   selecting one of the first and second procedures based on the component images,
   wherein the first and second fluorescent probes are the same.

41. The method of claim 40, wherein the selecting comprises identifying regions in each of the component images having an intensity level larger than a non-zero threshold intensity level.

42. The method of claim 40, further comprising, for each of the component images, determining a total fluorescence intensity corresponding to microRNA, and selecting the first or second procedure based on the total fluorescence intensities.

43. The method of claim 40, further comprising, for each of the component images, determining a distribution of the microRNA in the sample based on the component image, and selecting the first or second procedure based on the distributions.

44. The method of claim 40, wherein the decomposing comprises, for each of the samples, obtaining additional component images, each of the additional component images corresponding to components in the sample other than the microRNA.

45. The method of claim 44, further comprising, for each of the samples, identifying one or more of the other components in the sample based on the additional component images, and selecting the first or second procedure based on information derived from the additional component images.

* * * * *

UNITED STATES PATENT AND TRADEMARK OFFICE
CERTIFICATE OF CORRECTION

PATENT NO. : 8,644,580 B2  
APPLICATION NO. : 12/537342  
DATED : February 4, 2014  
INVENTOR(S) : David Lynch Page 1 of 1

It is certified that error appears in the above-identified patent and that said Letters Patent is hereby corrected as shown below:

Title Page 2
Column 2, line 5, (Other Publications), delete "(β-Site" and insert -- β-Site --

In the Claims:

Column 19
Line 31 (Approx.), In Claim 25, delete "to in" and insert -- in --

Column 20
Line 3, In Claim 32, after "about" delete "miRNA"

Signed and Sealed this
Twentieth Day of May, 2014

Michelle K. Lee
*Deputy Director of the United States Patent and Trademark Office*